March 2, 1965  H. FIKENTSCHER ETAL  3,171,873
PRODUCTION OF CAST FILMS FROM POLYVINYL CHLORIDE
OR VINYL CHLORIDE COPOLYMERS
Filed Sept. 23, 1960
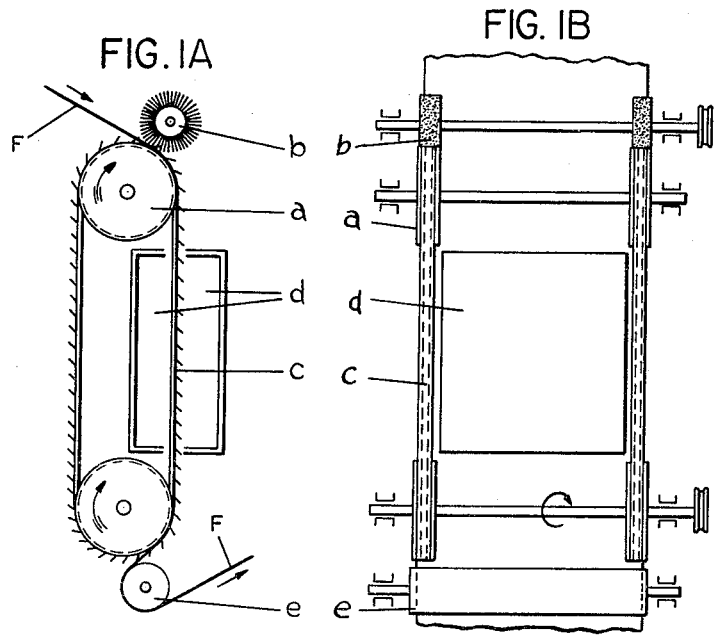
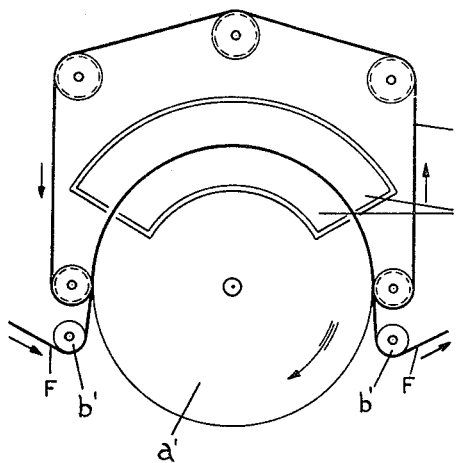
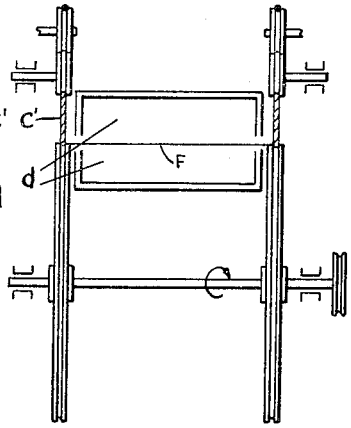
*INVENTORS*
HANS FIKENTSCHER
KARL HERRLE
BY LOTHAR SCHLEMMER
HERBERT WAGNER
ATTORNEYS

1

3,171,873
PRODUCTION OF CAST FILMS FROM POLYVINYL CHLORIDE OR VINYL CHLORIDE COPOLYMERS
Hans Fikentscher, Bad Duerkheim, and Karl Herrle, Lothar Schlemmer, and Herbert Wagner, Ludwigshafen (Rhine), Germany, assignors to Badische Anilin- & Soda-Fabrik Aktiengesellschaft, Ludwigshafen (Rhine), Germany
Filed Sept. 23, 1960, Ser. No. 58,032
Claims priority, application Germany, Sept. 26, 1959, B 54,947
6 Claims. (Cl. 264—216)

This invention relates to the production of cast films, i.e., films obtained by casting solutions of vinyl chloride polymers on, for example, band-shaped supports.

Polyvinyl chloride and copolymers containing vinyl chloride obstinately retain solvents. Films cast from these polymers by the usual methods therefore contain 5 to 15% of solvent which can only be removed with difficulty by subsequent drying at the usual temperatures. Films of this kind are therefore only suitable for special applications.

The object of this invention is to provide cast films of high molecular weight polymers of vinyl chloride that are practically free from solvent. The said object is achieved by subjecting the solvent-containing films obtained in conventional manner by casting solutions of high molecular weight polymers of vinyl chloride, after removal from the casting supports, to after-drying at a temperature between 150° and 300° C., the films being held only at the edges. After-drying is preferably carried out at a temperature between 150° and 250° C. The temperature depends on the $k$-value and the softening temperature of the polymer used for the production of the film. With pure polyvinyl chloride having a high $k$-value, for example a $k$-value of 70, a higher drying temperature should be applied than in the case of copolymers of vinyl chloride having a low $k$-value and a low softening temperature. At the said temperatures, the solvent contained in the films is given off very rapidly. Surprisingly, the films at the said temperatures still have sufficient strength, in spite of great tackiness, to be led through a heating zone while being held only at the edges.

The residence period of the films in the heating zone should preferably not exceed 5 minutes and is advantageously between 10 seconds and 3 minutes. It depends on the drying temperature applied and is the shorter the higher the drying temperature chosen. At drying temperatures around 250° up to 300° C. the residence period advantageously does not exceed a few seconds, e.g., 5 to 30 seconds.

The invention will now be described with reference to the accompanying diagrammatic drawing which, by way of example, shows apparatus suitable for carrying out the process of the invention.

Referring first to FIGURE 1, a film F containing solvent is applied by means of two pressure rollers $b$ to two endless spiked bands or clamp chains $c$ on two guide discs $a$ arranged at a maximum distance equal to the width of the film. The film is then subjected to after-drying in a drying chamber $d$ while being held only at the edges by the spiked bands or clamp chains $c$. The dried film is detached from the spiked bands or clamp chains by way of a wind-up roller $e$.

The solvent-containing film F may however also be passed by means of two deflecting rollers $b'$ over two driving discs $a'$ arranged at a maximum distance equal to the width of the film (c.f. FIGURE 2). The edges of the film are pressed on to the driving discs by means of an endless wire cable or chain $c'$. The film is then subjected to after-drying in a drying chamber $d$ while being held only laterally on the driving discs.

By leading the spiked bands or clamp chains $c$ of FIGURE 1 apart or by canting the discs $a'$ of FIGURE 2, it is also possible to stretch the film transversely during after-drying and thus to improve its mechanical properties.

In accordance with the invention, the film is dried in a drying chamber by means of hot air, heat radiators or high-frequency radiators, with or without the use of reflectors, at temperatures of 150° to 300° C., preferably 150° to 250° C., especially 200° to 250° C.

By the process above described, films, especially of polyvinyl chloride, and films of copolymers of vinyl chloride with, for example, vinylidene, chloride, acrylic esters, Methacrylic esters, maleic esters, acrylonitrile, styrene and vinyl esters, can be prepared. The polymers of vinyl chloride advantageously have $k$-values between 50 and 90, preferably between 55 and 75. The films may contain additives, such as dyes and pigments. In order to avoid yellowing, it is advisable to add to the films small amounts of the usual stabilizers, such as organic tin compounds, epoxy compounds or aminocrotonic acid esters.

Films obtained by the new process are distinguished by especially high gloss on both faces. By reason of their good resistance to water and oil they are suitable for packaging, for example foodstuffs.

The following examples will further illustrate this invention but the invention is not restricted to these examples.

*Example 1*

A 20% tetrahydrofurane solution of a polyvinyl chloride ($k$-value 70) prepared in suspension and containing 0.5% (with reference to the amount of dissolved polyvinyl chloride) of dibutyl tin dilaurate is cast to a film 40 microns thick in the usual way on a band casting machine. The film drawn off at a speed of 3 meters per minute contains about 10% of solvent and softens at 45° C. The solvent-containing film, after leaving the casting support, is led through a drying apparatus of the type shown in FIGURE 1 of the accompanying drawing. In the drying chamber, in which each part of the film remains for 10 seconds and in which the temperature is about 220° C., the film is exposed to infra-red rays on either face. A completely clear and colorless film is obtained which contains practically no solvent and which softens at 80° C. Both surfaces of the film are highly glossy.

*Example 2*

25 parts of a copolymer from 80 parts of vinyl chloride, 10 parts of maleic dimethyl ester and 10 parts of maleic diethyl ester with a $k$-value of 60 are dissolved in 75 parts of a mixture of 50 parts of acetone and 50 parts of toluene. This solution is cast on a film casting machine in conventional manner to a film 45 microns in thickness. The film drawn off from the casting machine softens at about 50° C. and contains approximately 9% by weight of solvent.

The said solvent-containing film is clamped between two parallel wires and dried in a drying chamber by means of a stream of hot air at a temperature of 220° C., the residence period being 30 seconds. The film obtained softens at 74° C. and contains only 0.2% by weight of solvent.

If the film is dried for 30 seconds at 140° C., it softens at 60° C. and contains 5% by weight of solvent.

*Example 3*

A 28% solution in tetrahydrofurane of a copolymer from 87 parts of vinyl chloride and 13 parts of vinyl acetate with a k-value of 55 is cast on a film casting machine in conventional manner to a film 40 microns in thickness. The film obtained contains 7% by weight of solvent and softens at approximately 55° C.

If the said solvent-containing film is dried for 1 minute at 180° C. in the manner described in Example 1, it softens at 68° C. and contains but 0.12% by weight of solvent.

What we claim is:

1. In a process for the production of a cast film of a high molecular weight polymer of vinyl chloride wherein said polymer in combination with a solvent is first cast onto and then removed from a supporting surface in the form of a film, the improvement which comprises: first removing the cast film containing 5 to 15% of said solvent from said supporting surface; and then while holding said film only at its edges, drying said film for removal of said solvent at a temperature of from 150° C. to 300° C.

2. A process as claimed in claim 1 wherein the film is subjected to said drying for a period of about 5 seconds to 3 minutes.

3. A process as claimed in claim 1 wherein the film is subjected to said drying for a period of about 5 to 30 seconds.

4. A process as claimed in claim 1 wherein the drying temperature is about 200° C. to 250° C.

5. A process as claimed in claim 1 wherein the vinyl chloride polymer has a k-value of between 50 and 90.

6. A process for the production of a cast film of a vinyl chloride polymer having a k-value between 50 and 90 which comprises: casting a solvent solution of said polymer in the form of a film onto a supporting surface; removing the cast film containing 5 to 15% of said solvent from said supporting surface; and then while holding said film only at its edges, leading said film through a drying zone heated to a temperature of from 150° C. to 250° C. for removal of said solvent, the residence time of said film in said drying zone being about 5 to 30 seconds.

References Cited in the file of this patent

UNITED STATES PATENTS

| | | |
|---|---|---|
| 1,717,004 | Buck | June 11, 1929 |
| 1,991,137 | Case et al. | Feb. 12, 1935 |
| 2,074,285 | Studt et al. | Mar. 16, 1937 |
| 2,160,937 | Reilly | June 6, 1939 |
| 2,308,161 | Eckstein | Jan. 12, 1943 |
| 2,434,231 | Seitz | Jan. 6, 1948 |
| 2,591,621 | Shegda | Apr. 1, 1952 |
| 2,656,449 | Elgar | Oct. 20, 1953 |
| 2,710,426 | Platzer | June 14, 1955 |
| 2,895,171 | Holmes-Walker et al. | July 21, 1959 |
| 2,918,702 | Wettereau | Dec. 29, 1959 |
| 2,946,095 | Beer | July 26, 1960 |
| 2,957,206 | Mindick | Oct. 25, 1960 |

FOREIGN PATENTS

| | | |
|---|---|---|
| 96,874 | Germany | Apr. 22, 1898 |